(12) United States Patent
Chen

(10) Patent No.: US 7,522,321 B2
(45) Date of Patent: Apr. 21, 2009

(54) IMAGE CAPTURING APPARATUS AND METHOD

(75) Inventor: Yen-Cheng Chen, Taiwan (TW)

(73) Assignee: Avision Inc. (TW)

( * ) Notice: Subject to any disclaimer, the term of this patent is extended or adjusted under 35 U.S.C. 154(b) by 1043 days.

(21) Appl. No.: 10/876,518

(22) Filed: Jun. 28, 2004

(65) Prior Publication Data

US 2005/0052712 A1 Mar. 10, 2005

(30) Foreign Application Priority Data

Aug. 21, 2003 (TW) ............................. 92123073 A

(51) Int. Cl.
*H04N 1/04* (2006.01)

(52) U.S. Cl. .................... 358/498; 358/497; 358/496; 358/474

(58) Field of Classification Search ............... 358/498, 358/497, 496, 1.16, 1.17, 474, 482, 483, 358/505, 513, 514; 399/364, 374, 372, 367; 355/23, 24; 250/208.1
See application file for complete search history.

(56) References Cited

U.S. PATENT DOCUMENTS

| | | | | |
|---|---|---|---|---|
| 4,743,974 A * | 5/1988 | Lockwood | .................. | 358/496 |
| 6,721,074 B1 * | 4/2004 | Kao | ............................ | 358/496 |
| 7,119,931 B2 * | 10/2006 | Miyamoto et al. | .......... | 358/474 |
| 7,248,378 B2 * | 7/2007 | Shiraishi | ..................... | 399/364 |
| 7,298,388 B2 * | 11/2007 | Hsieh et al. | ................. | 358/498 |
| 7,324,235 B2 * | 1/2008 | Yamazaki | ................... | 358/1.17 |
| 2002/0105686 A1 * | 8/2002 | Hasegawa et al. | ........... | 358/498 |
| 2004/0170314 A1 * | 9/2004 | Harris et al. | ................. | 358/482 |
| 2005/0094226 A1 * | 5/2005 | Burch | ........................ | 358/498 |
| 2005/0094228 A1 * | 5/2005 | Sevier | ........................ | 358/498 |
| 2005/0254105 A1 * | 11/2005 | Muzzin et al. | .............. | 358/498 |

FOREIGN PATENT DOCUMENTS

JP 10294830 A 11/1998

\* cited by examiner

*Primary Examiner*—Houshang Safaipour
(74) *Attorney, Agent, or Firm*—Rabin & Berdo, PC

(57) ABSTRACT

An image capturing apparatus is provided for scanning documents, each of which has first and second pages of data. The image capturing apparatus includes first and second image sensors for reading the first and second pages of data of the documents. The method of capturing images includes scanning the m-th document and registering the first and the second image data in the first and second memories of one memory set and outputting the image data, wherein the value m has an initial value of 1; and increasing m by an increment of 1 when in the first and the second memories of at least one memory set are stored no image data or the first and the second image data are being completely output, and repeating the step of scanning the m-th document until the image capturing of all the documents is completed.

18 Claims, 9 Drawing Sheets

IMAGE CAPTURING APPARATUS AND METHOD

This application claims the benefit of Taiwan application Serial No. 092123073, filed Aug. 21, 2003, the subject matter of which is incorporated herein by reference.

BACKGROUND OF THE INVENTION

1. Field of the Invention

The invention relates in general to an image capturing apparatus, which can do one pass duplex image scanning, and its method, and more particularly to an image capturing apparatus and method, which can reduce the period of time in waiting for image data in buffer memories to be transmitted before the next document can be scanned and improve the scan efficiency.

2. Description of the Related Art

Today's technology places emphasis on speed and efficiency. Hence, scanners are constantly innovated in order to increase the scan speed in addition to providing high-quality images by resolution improvement. For example, flatbed scanners in early years took a lot of time reading images, for documents can only be manually placed on the flatbed and be scanned sheet by sheet. After the automatic document feeding technique has been developed, the scanner equipped with the automatic document feeder (ADF) can continuously scan tens of sheets of documents and transmit the image data thereof to computers for further processing, thereby saving the time of placing and retrieving each of the documents manually. Some scanners with automatic document feeding function can even read documents by one pass duplex scanning.

Referring to FIG. 1A, a lateral view of a flatbed image capturing apparatus, which is equipped with an ADF to perform one pass duplex scanning, is shown. The image capturing apparatus 100 includes a base 110, and an ADF 120 disposed on the base 110. The ADF 120 is provided for feeding to-be-scanned documents 122, and each document 122 has a first page of data 122a (the page facing upward) and a second page of data 122b (the page facing downward). The base 110 includes a flatbed 112, a first image sensor 114, and a circuit board 116, while the ADF 120 includes a second image sensor 124. As the documents 122 are to be scanned, they are fed onto the flatbed 112 via the ADF 120, in which the first page of data 122a and the second page of data 122b of each document are respectively read by the first image sensor 114 installed in the base 110 and the second image sensor 124 installed in the ADF 120. The image data thereof are converted to electrical signals and stored in memories on the circuit board 116, or further transmitted to an exterior host 130. FIG. 1B shows a lateral view of a one-pass-duplex-scanning sheet-fed scanner. Its process of one pass duplex scanning is similar to that of the flatbed scanner having the ADF as shown in FIG. 1A.

Referring to FIG. 1C, a block diagram illustrating the image reading of the image sensors, and the storage and transmission of the corresponding image data in FIG. 1A and FIG. 1B is shown. The circuit board 116 includes a memory module 117 and an image processor 118. The memory module 117 includes a first memory (buffer memory) 117a and a second memory (buffer memory) 117b for respectively registering the image data I112a, corresponding to the first page of data 122a and read by the first image sensor 114, and the image data I122b, corresponding to the second page of data 122b and read by the second sensor 124. The image processor 118 is provided for processing the image data transmitted from the memory module 117 and transmitting them to the host 130.

Generally, the image data I122b can be transmitted to the memory module 117 only after the image data I122a, previously stored in the memory module 117, has been transmitted to the image processor 118. For scanners having a high resolution of, for instance, 600 dpi, the speed of the image sensors 114 and 124 reading documents 122 is usually higher than that of transmitting image data I122a and I122b from the memory module 117 to the image processor 118. That is, the scan time (ts) is usually smaller than the data transmission time (td) as shown in FIG. 1D. Supposed that T1 is the time of performing one pass duplex scanning of one sheet of document 122, and T1a and T1b are respectively the time of transmitting the corresponding image data I122a and I122b from the memory module 117 to the image processor 118, both T1a and T1b are larger than T1. Therefore, the image data I122a and I122b corresponding to a certain sheet of document 122 can only be registered in the memory module 117 after those corresponding to the prior sheet of document 122 are being completely transmitted. This period of delay time Tw is (T1a+T1b−T1). The delay time Tw recurs and adds up as each sheet of document 122 is being scanned, so the more documents are being scanned, longer the period of the delay time will be in the scanning process. As a result, the scan speed and scan efficiency will be greatly reduced.

SUMMARY OF THE INVENTION

It is therefore an object of the invention to provide an image capturing apparatus and a method for reducing the period of time that image sensors wait for the image data in the memory set to be transmitted before beginning to read the data of the next document and in result improving the scan speed by increasing the number of memory sets in the image capturing apparatus.

The invention achieves the above-identified objects by providing an image capturing apparatus for scanning a number of documents. Each document has a first page of data and a second page of data. The image capturing apparatus includes a first image sensor and a second image sensor. The first image sensor is provided for reading the first page of data and outputting the first image data corresponding to the first page of data. The second image sensor is provided for reading the second page of data and outputting the second image data corresponding to the second page of data. The image capturing apparatus further includes a number of first memories and a number of second memories for correspondingly registering the first image data and the second image data of each document.

The invention achieves the above-identified objects by providing a method for an image capturing apparatus to scan n documents. Each document has a first page of data and a second page of data, and the image capturing apparatus has q memory sets, wherein the values q and n are positive integers. The method includes the steps of: scanning the m-th document; respectively registering the corresponding first image data and second image data in the first memory and the second memory of one of the memory sets in the memory module; outputting the first image data and the second image data, wherein m≦n, and the value m is a positive integer and has an initial value of 1; increasing the value m by an increment of 1 when in the first memory and the second memory of at least one of the q memory sets are stored no image data or the first image data and the second image data are being completely output; and repeating the step of scanning the m-th document until the image capturing apparatus has completed capturing the image of all the n documents.

The invention achieves the above-identified objects by further providing a method for an image capturing apparatus to scan n documents. Each document has a first page of data and a second page of data, and the image capturing apparatus has q memory sets. The method includes the steps of: setting a value m to 1; determining if the value m is smaller than q, wherein k=m if the value m is smaller than q, and k=(m mod q)+1 if the value m is not smaller than q; reading the first page of data and the second page of data of the m-th document with the first image sensor and the second image sensor; registering the first image data Ima and the second image data Imb, respectively corresponding to the first page of data and the second page of data of the m-th document, into the k-th memory set and outputting the first image data Ima and the second image data Imb; and determining if the value m is smaller than n, wherein if m is smaller than n, increasing m by 1 and returning to the step of determining if m is smaller than q.

Other objects, features, and advantages of the invention will become apparent from the following detailed description of the preferred but non-limiting embodiments. The following description is made with reference to the accompanying drawings.

DETAILED DESCRIPTION OF THE INVENTION

In order to reduce the period of time in waiting for image data in the memory to be completely transmitted to an image processor before the scanning process of a next document begins and to improve the scan speed, especially in one pass duplex scanning process, at least two memory modules, into which both pages of data of each document are registered, are provided, so that as the first memory module is transmitting the image data of one document, the next document can be scanned and the corresponding image data can be registered into the second memory module. The image data in the second memory module will be transmitted after that in the first memory module has been transmitted. Therefore, the overall scan time can be effectively reduced.

Figure 1A:
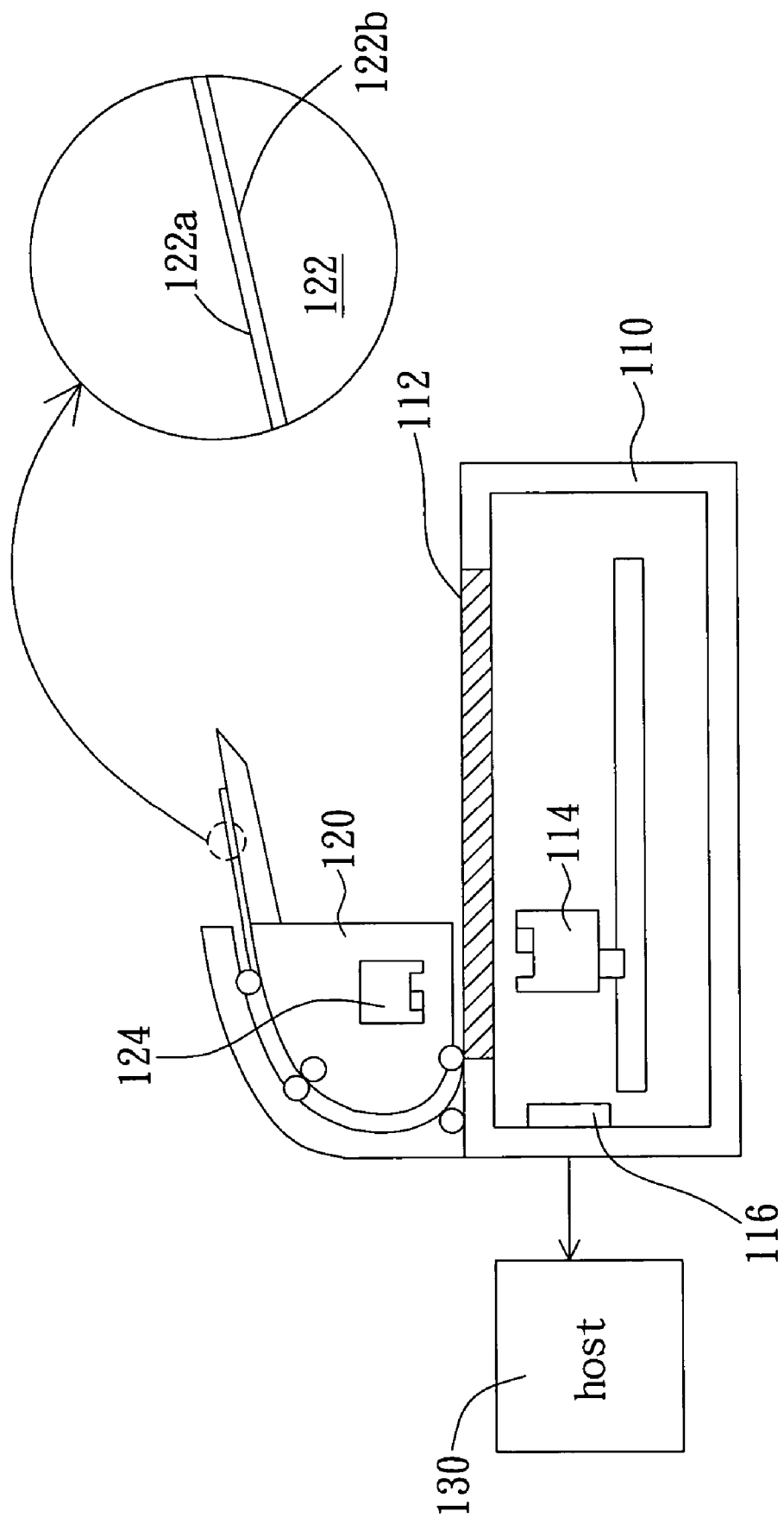
FIG. 1A is a lateral view of a flatbed image capturing apparatus, which is equipped with an ADF to perform one pass duplex scanning.
Figure 1B:
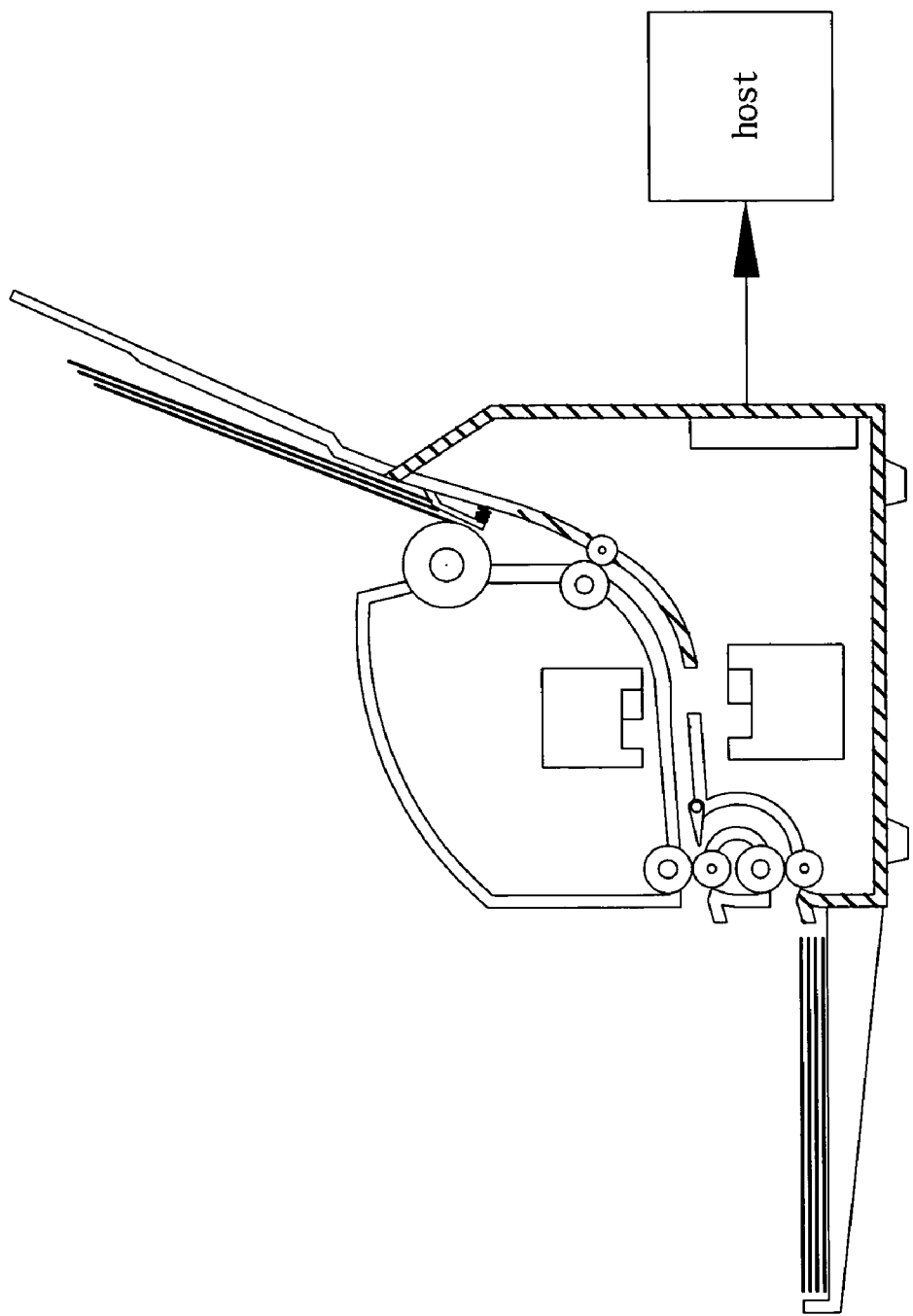
FIG. 1B is a lateral view of a one-pass-duplex-scanning sheet-fed scanner.
Figure 1C:
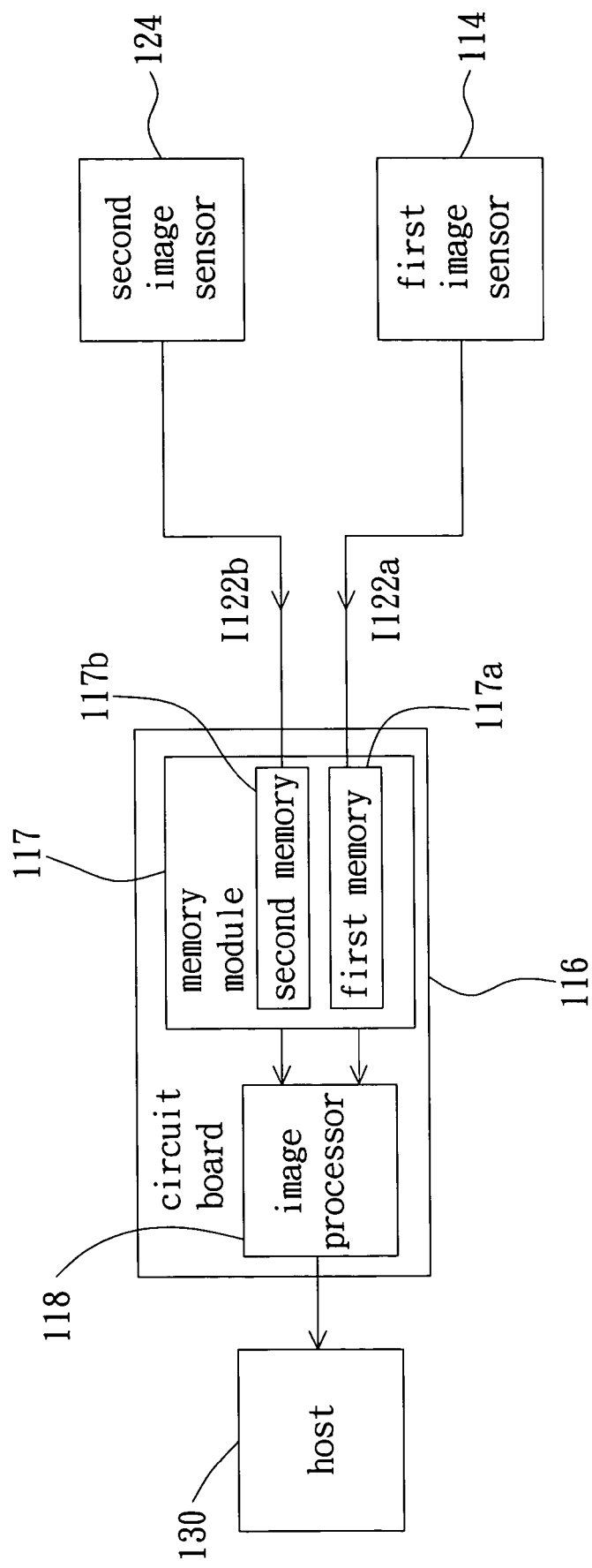
FIG. 1C is a block diagram illustrating the image reading of the image sensors and the storage and transmission of the corresponding image data in FIG. 1A and FIG. 1B.
Figure 1D:
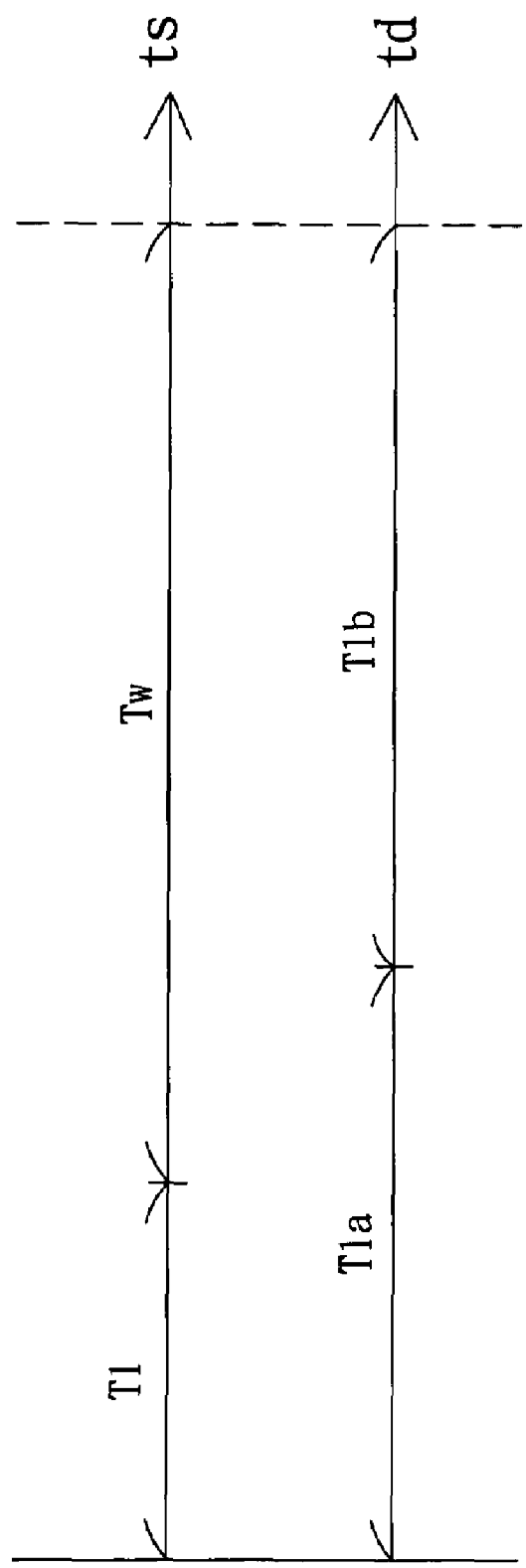
FIG. 1D is a schematic diagram of the comparison between the scan time (ts) and the data transmission time (td) in FIG. 1C.
Figure 2A:
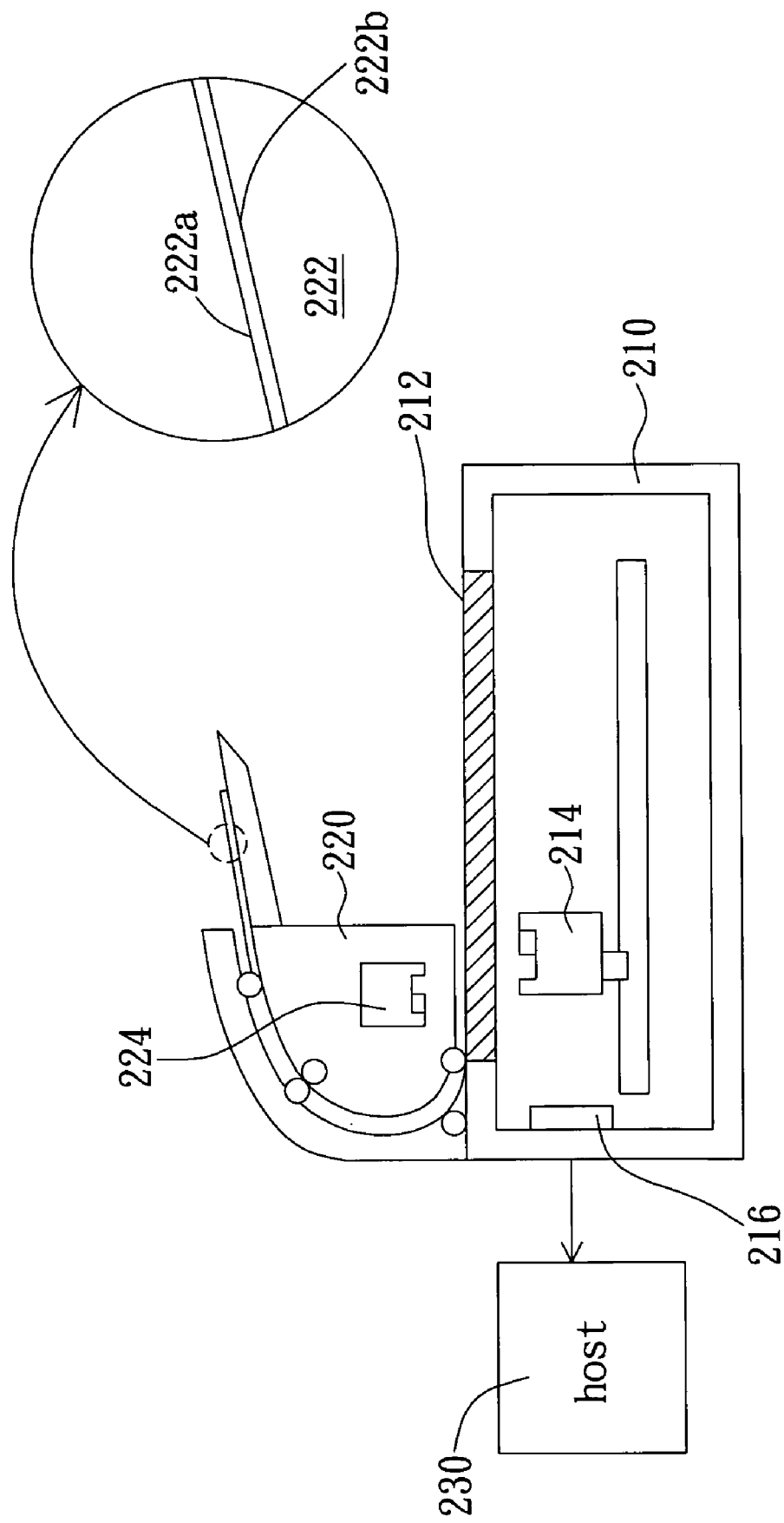
FIG. 2A is a schematic view of the flatbed scanner equipped with an ADF according to a preferred embodiment of the invention.

Referring to FIG. 2A, a schematic view of the flatbed scanner equipped with an ADF according to a preferred embodiment of the invention is shown. The image capturing apparatus 200 is provided for scanning n to-be-scanned documents 222, and each document 222 has a first page of data (the page facing upward) 222a and a second page of data (the page facing downward) 222b. The image capturing apparatus 200 includes a base 210 and an ADF 220 (such as a U-type ADF) disposed on the base 210. The base 210 includes a flatbed 212, a first image sensor 214, and a circuit board 216. The first image sensor 214 is provided for reading the first page of data 222a of the documents 222. In addition, the ADF 220, used for feeding the documents 222, has a second image sensor 224 for reading the second page of data 222b of the documents 222.

As the image capturing apparatus is performing the one pass duplex scanning, one of the documents 222 is fed through the ADF 220 and then onto the flatbed 212, where the first page of data 222a and the second page of data 222b are read simultaneously with the first image sensor 214 and the second image sensor 224, and the corresponding image data are registered into the memory on the circuit board 216 or further transmitted to the host 230.

Figure 2B:
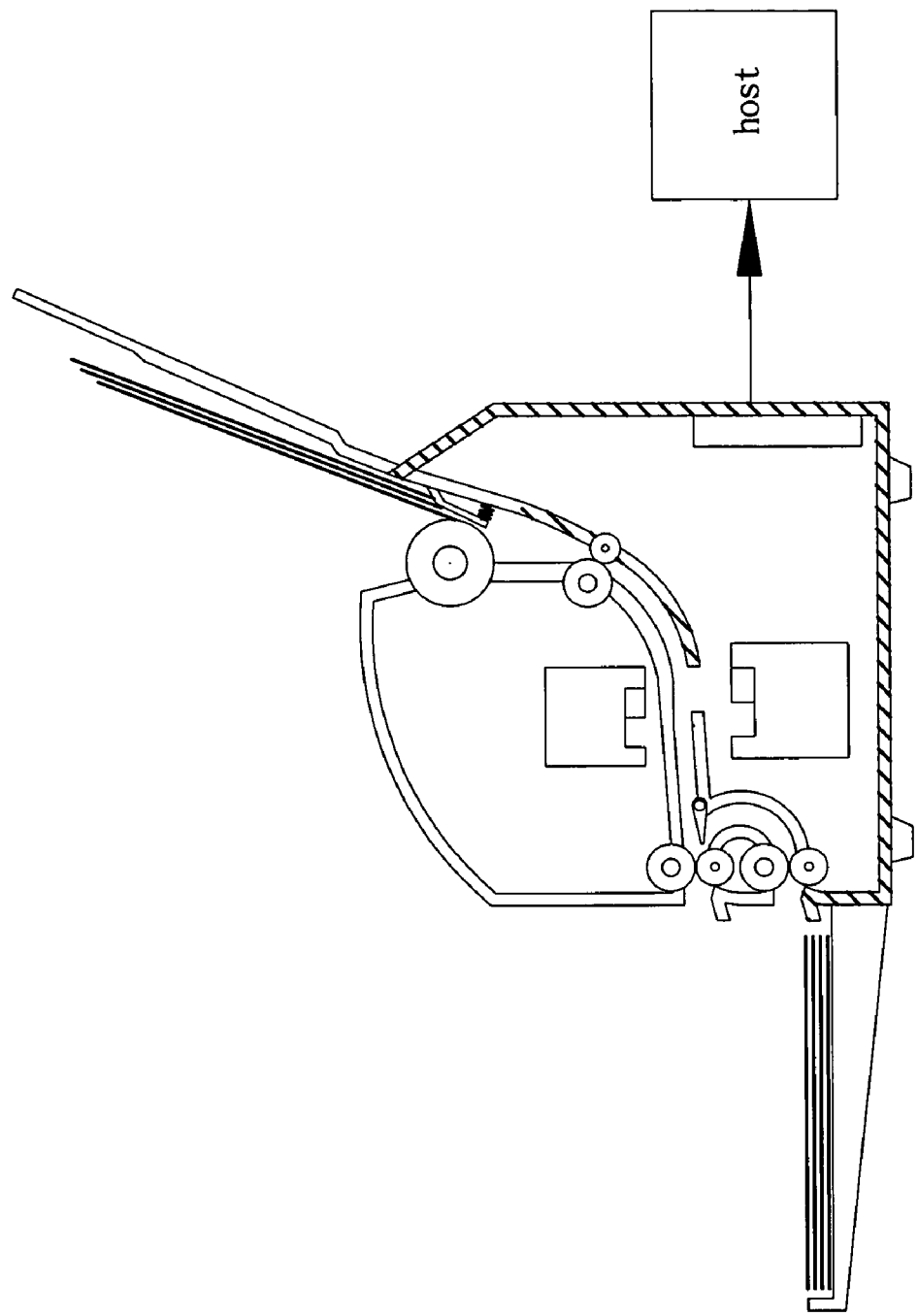
FIG. 2B is a schematic view of a one-pass-duplex-scanning sheet-fed scanner.

FIG. 2B shows a schematic view of a one-pass-duplex-scanning sheet-fed scanner according to the invention. The process of one pass duplex scanning is similar to that of the flatbed scanner having the ADF as described above.

The first and the second image sensors 214 and 224 can be charge-coupled devices (CCDs) or contact image sensors (CISs).

Figure 2C:
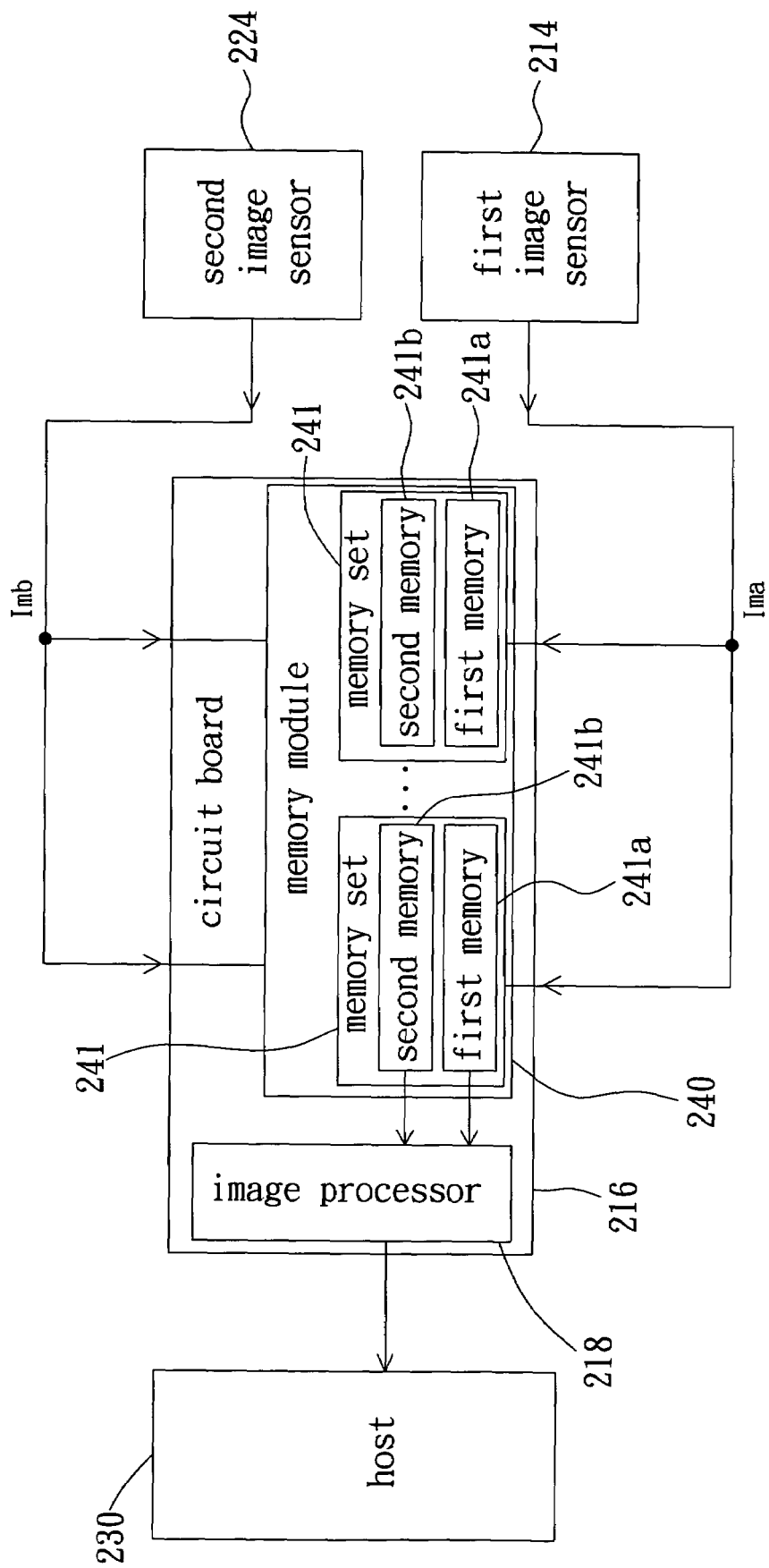
FIG. 2C is a block diagram illustrating the image reading of the image sensors, and the storage and transmission of the corresponding image data in FIG. 2A and FIG. 2B.

Referring to FIG. 2C, a block diagram illustrating the image reading of the image sensors, and the storage and transmission of the corresponding image data in FIG. 2A and FIG. 2B is shown. The circuit board 216 includes a memory module 240 and an image processor 218. The invention features at least one more memory set in the memory module 240 than that in the prior art. The memory module 240 includes q (q is a positive integer) memory sets 241, and each memory set 241 includes a first memory 241a and a second memory 241b for respectively registering the first image data Ima (m is a positive integer not larger than n) corresponding to the first page of data 222a and the second image data Imb correspond to the second page of data 222b. The image processor 218, controlled by the computer host 230, processes the first and the second image data transmitted from the memory module 240 and transmits them to the computer host 230. The first memory 241a and the second memory 241b each have sufficient memory spaces for respectively registering the first and the second image data Ima and Imb corresponding to the first and the second pages of data 222a and 222b of one document 222.

Figure 3A:
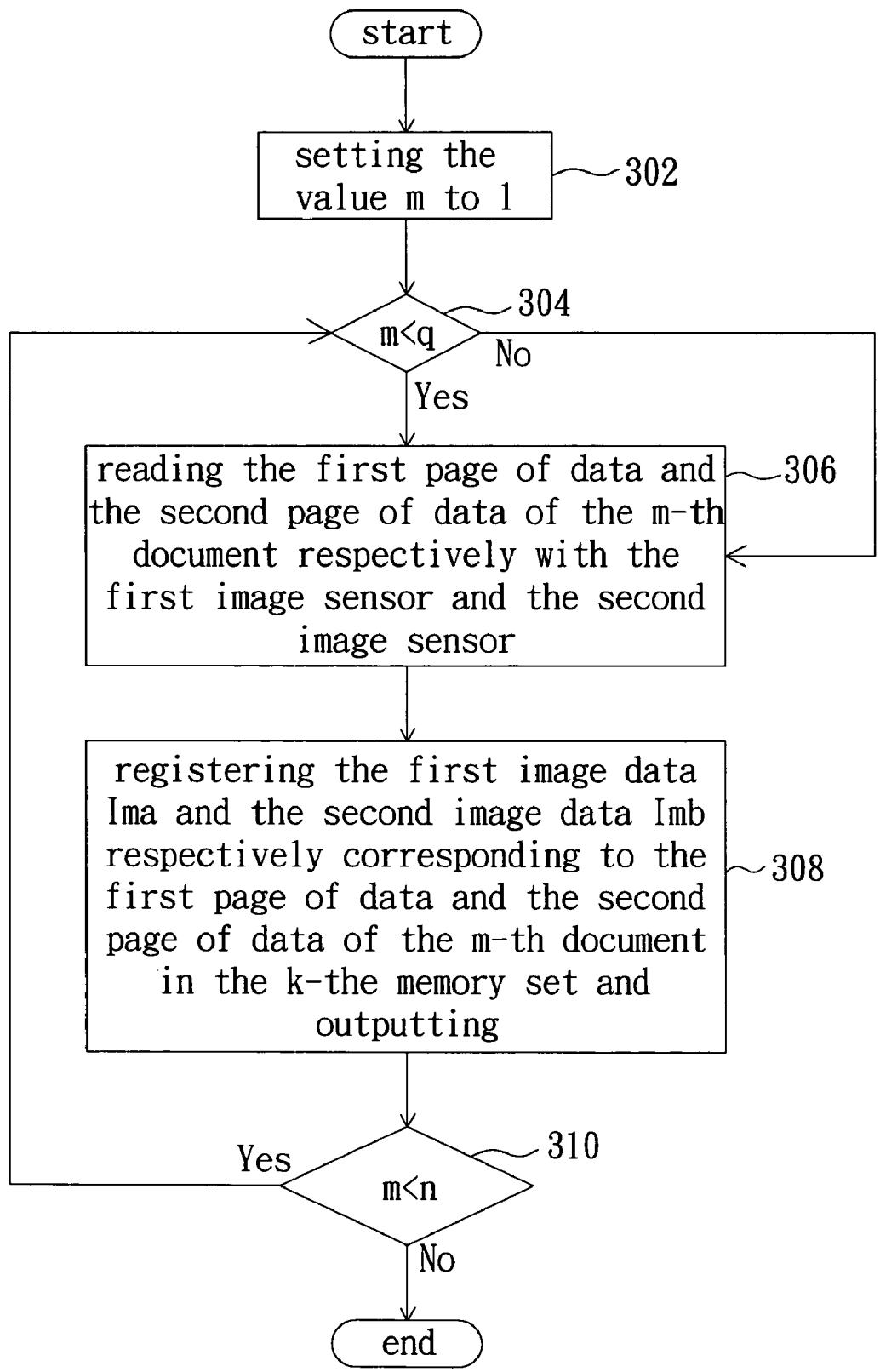
FIG. 3A is a flow chart of the image capturing method according to a preferred embodiment of the invention.

In the following description, the scanner, which has q memory sets and is capable of scanning n documents 222, will be taken as an example to illustrate the image capturing method according to the invention. Referring to FIG. 3A, a flow chart of the image capturing method according to a preferred embodiment of the invention is shown. In the step 302, a value m is given and set to 1, wherein m≦n and m is a positive integer. In the step 304, whether m is smaller than q is determined. If m<q, k=m. If m≧q, k=(m mod q)+1. Subsequently, in the step 306, the first page of data 222a and the second page of data 222b of the m-th document 222 are respectively read with the first image sensor 214 and the second image sensor 224, where one pass duplex scanning is being performed. In the step 308, the first image data Ima and the second image data Imb respectively corresponding to the first page of data 222a and the second page of data 222b of the m-th document are registered in the k-th memory set 241 and subsequently being output.

The first and the second image data Ima and Imb registered in the k-th memory set 241 can be output at the same time as another memory set 241 is registering another image data. That is, at the same time as the (m+1)-th sheet of document 222 is scanned and the corresponding first and second image data I(m+1)a and I(m+1)b are registered into the (k+1)-th memory set, the first and the second image data Ima and Imb can be transmitted from the k-th memory set to the image processor 218.

Proceeding to the step 310, whether m is smaller than n is determined. If m is smaller than n, m is set to (m+1), and the process is returned to the step 304. If m is not smaller than n, the process is ended after the first and the second image data Ima and Imb registered in the q memory sets 241 has all been transmitted, which indicates that the process of scanning n documents 222 is completed.

Figure 3B:
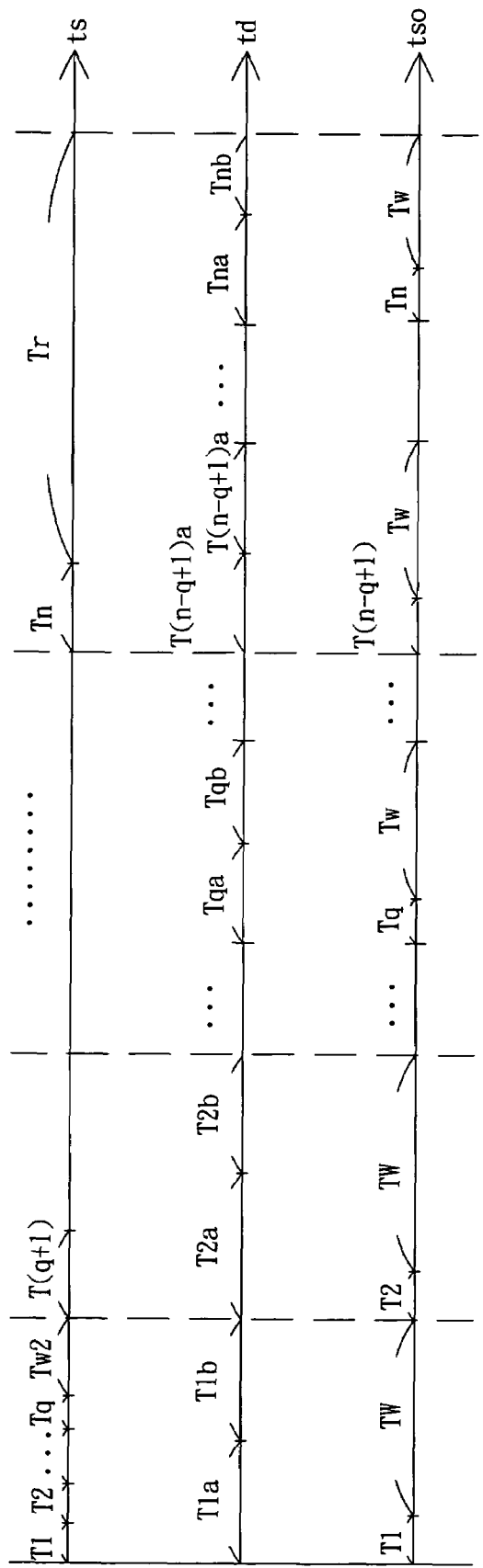
FIG. 3B is a schematic diagram of the comparison among the scan time (ts) in the image capturing process of FIG. 3A, the conventional scan time (tso), and the transmission time (td) of image data in the memory set.

Referring to FIG. 3B, a schematic diagram of the comparison among the scan time (ts) in the image capturing process of FIG. 3A, the conventional scan time (tso), and the transmission time (td) of image data in the memory set 241 is shown. As described above, let Tm be the time of scanning two pages of data 222a and 222b of the m-th (m=1, . . . ,n) document 222 and registering the corresponding image data Ima and Imb into the k-th (k=1, . . . ,q) memory set 241. Let Tma and Tmb be respectively the time that the image data Ima and Imb are transmitted from the k-th memory set 241 to the image processor 218. Since at least two memory set 241 are disposed in the scanner of the invention, the 2-th, . . . , and the q-th documents 222 can be continuously scanned after the first sheet of document 222, and the waiting time Tw (=T1a+T1b−T1) before the scanner begins to scan the second document 222 in the prior art is unnecessary. Moreover, the waiting time Tw2 of the (q+1)-th document 222 after the q-th document 222 is scanned is only (T1a+T1b−(T1+T2+ . . . +Tq)), which is much shorter than the conventional delay time Tw (=T1a+T1b−T1). Even the image sensor can continuously read all the documents at a time without wasting any waiting time. Since the waiting time is shortened (Tw2<Tw), a period of time Tr is saved from implementing the invention during the process of the scanning of the n-th document 222 and the complete transmission of the image data Ina and Inb to the image processor 218: Tr=T(n−q+1)a+T(n−q+1)b+ . . . +Tna+Tnb−Tn, which is more than the conventional waiting time Tw (=T1a+T1b−T1). As the value n or q is increased, the time Tr becomes lengthened, which could be useful for doing printing jobs or other trivial jobs, such as changing papers for printers. Therefore, the scan speed and the efficiency of the scanner can be effectively improved.

In the embodiment of the invention, the memory module 240, including q memory sets, is disposed on the circuit board 216 in the base 210. However, the first memories 241a and the second memories 241b of the q memory sets can be respectively disposed in the base 210 and in the ADF 220, which can also achieve the goal of reducing the waiting time. Moreover, the image capturing apparatus 200 can be a flatbed scanner equipped with a ADF. Or it can be a sheet-fed scanner, which has the automatic document feeding function and has the first and the second image sensors 214 and 224 as mentioned above respectively disposed in the base and in the upper cover for one pass duplex scan. Even the image capturing apparatus in the invention can also be a manual flatbed scanner. As long as at least one memory set is added in the memory module according to the invention, the aim to reduce the waiting time can be achieved. Therefore, all these alternatives will not depart from the skill scope of the invention.

As the preferred embodiment illustrates above, the image capturing apparatus in the invention has the following advantages: using at least two memory sets to subsequently register image data corresponding to at least two to-be-scanned documents can reduce the conventional waiting time for the image data corresponding to the first document to be transmitted from the first memory set before the second sheet of document is scanned. For this reason, the time saved during the process of the scanning of all the documents and the complete transmission of their corresponding image data from the memory module to the image processor will be much more than the conventional waiting time, and the time saved can be used for doing printing jobs or changing papers for printers. Therefore, the scan speed and the efficiency of the scanner can be largely improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing apparatus capable of duplex scanning and used for scanning a plurality of documents, each document having a first page of data and a second page of data, comprising:

a first image sensor, for reading the first pages of data of the documents and outputting a plurality of first image data corresponding to the first pages of data of the documents;

a second image sensor, for reading the second pages of data of the documents and outputting a plurality of second image data corresponding to the second pages of data of the documents; and a first memory set and a second memory set, each of the first memory set and the second memory set comprising a first memory and a second memory for respectively registering and transmitting the first image data and the second image data of the documents;

wherein while the first memory set is transmitting the first image data and the second image data of one document, a next document is scanned and the first image data and the second image data of the next document are respectively registered into the first memory and the second memory of the second memory set.

2. The apparatus according to claim 1, wherein the first image sensor and the second image sensor are charge-coupled devices (CCDs).

3. The apparatus according to claim 1, wherein the first image sensor and the second image sensor are contact image sensors (CISs).

4. The apparatus according to claim 1 being a sheet-fed scanner.

5. The apparatus according to claim 1 being a flatbed scanner.

6. The apparatus according to claim 5, further comprising an automatic document feeder (ADF).

7. The apparatus according to claim 6, wherein the second image sensor is disposed in the ADF.

8. The apparatus according to claim 7, wherein both the first memories and the second memories are disposed in the flatbed scanner.

9. The apparatus according to claim 7, wherein the first memories and the second memories are respectively disposed in the flatbed scanner and in the ADF.

10. The apparatus according to claim 1, wherein each of the first memories and each of the second memories have sufficient memory spaces for respectively registering the first image data and the second image data corresponding to the first page of data and the second page of data of one document.

11. The apparatus according to claim 1, further comprising an image processor, coupled to the first memories and the second memories, for outputting the first image data and the second image data to a computer host.

12. A method of capturing images, for an image capturing apparatus to scan n documents, each document having a first page of data and a second page of data, the image capturing apparatus comprising a first image sensor, a second image sensor, and a memory module, the first image sensor and the second image sensor provided for reading the first page of data and the second page of data of each document, the memory module having q memory sets, each memory set having a first memory and a second memory respectively provided for registering the first image data corresponding to the first page of data and the second image data corresponding to the second page of data and outputting the image data, wherein the values q and n are positive integers, the method comprising the steps of:

scanning the m-th document, registering the corresponding first image data and second image data into the first memory and the second memory of one memory set in the memory module and outputting the first image data and the second image data, wherein $\leq$ n and the value m is a positive integer and has an initial value of 1;

increasing the value m by an increment of 1 when in the first memory and the second memory of at least one of the q memory sets are stored no image data or the first image data and the second image data are being completely output, and repeating the step of scanning the m-th document until the image capturing of all the n sheets of documents are completed;

wherein while the first image data and the second image data of the m-th document are being outputted from one memory set, the (m+1)-th document is scanned and the first image data and the second image data of the (m+1)-th document are respectively registered into the first memory and the second memory of another memory set.

13. The method according to claim 12, wherein the image capturing apparatus is a sheet-fed scanner.

14. The method according to claim 12, wherein the image capturing apparatus is a flatbed scanner.

15. The method according to claim 14, wherein the image capturing apparatus further comprises an automatic document feeder (ADF).

16. The method according to claim 12, wherein the first memory and the second memory of each memory set have sufficient memory spaces for respectively registering the first image data and the second image data corresponding to the first page of data and the second page of data of one document.

17. A method of capturing images, for scanning n documents with an image capturing apparatus capable of duplex scanning, each document comprising a first page of data and a second page of data, the image capturing apparatus comprising a first image sensor, a second image sensor, and a memory module, the memory module having q memory sets, each memory set having a first memory and a second memory for respectively registering a first image data corresponding to the first page of data and a second image data corresponding to the second page of data of each document, the method comprising the steps of:

a. setting a value m to 1;
b. determining if the value m is smaller than q, wherein k=m if the value m is smaller than q, and k=(m mod q)+1 if the value m is not smaller than q;
c. reading the first page of data and the second page of data of the m-th document with the first image sensor and the second image sensor;
d. registering the first image data Ima and the second image data Imb respectively corresponding to the first page of data and the second page of data of the m-th document, into the k-th memory set and outputting the image data; and
e. determining if the value m is smaller than n, wherein if m is smaller than n, increasing m by 1 and returning to the step b;

wherein when the first image data and the second image data of the m-th document is being outputted from the k-th memory set, the (m+1)-th document is scanned and the first image data and the second image data of the (m+1)-th document are respectively registered into the first memory and the second memory of the (k+1)-th memory set.

18. The method according to claim 17, wherein each of the first memory and the second memory of the k-th memory set has sufficient memory spaces for respectively registering the first image data and the second image data corresponding to the m-th document.

* * * * *